Sept. 13, 1966          C. A. BOYD          3,271,980

CHEMICAL ENERGY LASER PUMP

Filed March 16, 1964

INVENTOR.
CHARLES A. BOYD

BY Arthur H. Seidel

ATTORNEY

United States Patent Office 3,271,980
Patented Sept. 13, 1966

3,271,980
CHEMICAL ENERGY LASER PUMP
Charles A. Boyd, West Chester, Pa., assignor to Aeroprojects Incorporated, West Chester, Pa., a corporation of Pennsylvania
Filed Mar. 16, 1964, Ser. No. 352,247
9 Claims. (Cl. 67—33)

This invention relates to a chemical energy laser pump. More particularly, it relates to a high intensity chemically activated source of electromagnetic energy for pumping lasers.

With the development of lasers having high coherent energy light outputs, there has been a correlative need for laser pumps capable of providing a high energy light source. The present invention is a high energy chemical light source for laser pumping applications. In accordance with the present invention, energy in the $10^4$ joules-per-pulse range is obtained by rapid oxidation of metallic particles of controlled size in controlled atmospheres.

Extremely high flame temperatures, approaching dissociation temperatures of the product formed, can be achieved for certain metal-gaseous oxidant combinations by rapid and simultaneous ignition of the reacting mass and rapid chemical kinetics of the reaction. This results in a greater portion of the energy released being used to produce a higher flame temperature, and smaller losses through secondary dissipative mechanisms. The advantage of higher flame temperatures is that a greater fraction of the radiant energy lies in the shorter wavelengths useful for laser pumping.

The present invention produces extremely high flame temperatures by making use of shock wave phenomena. The shock waves are explosively generated, and produce rapid oxidation of finely divided metal powders.

It is an object of the present invention to provide a novel laser pump.

It is another object of the present invention to provide a chemical energy laser pump.

It is another object of the present invention to provide a novel method and apparatus of producing a high intensity chemically activated source of electromagnetic energy for pumping lasers.

It is still another object of the present invention to provide a novel method for producing a shock wave initiated high intensity chemically activated source of electromagnetic energy for pumping lasers.

It is yet another object of the present invention to provide a novel apparatus for producing a shock wave initiated high intensity source of electromagnetic energy for laser pumping.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
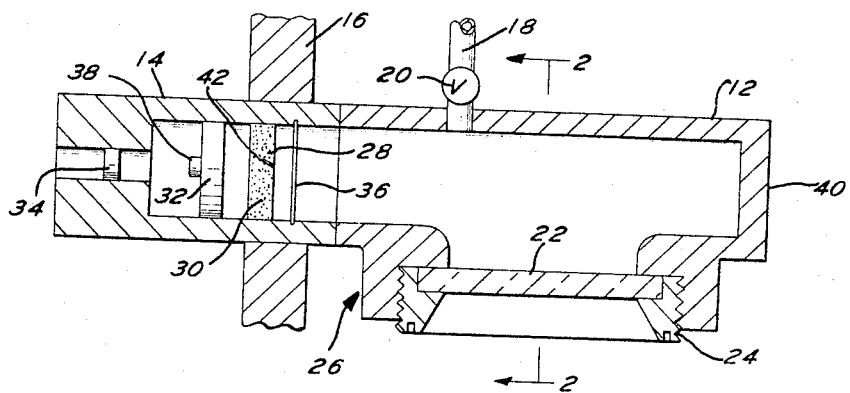
FIGURE 1 is a schematic longitudinal sectional view of the apparatus for producing a high intensity source of electromagnetic energy for laser pumping in accordance with this invention.
Figure 2:
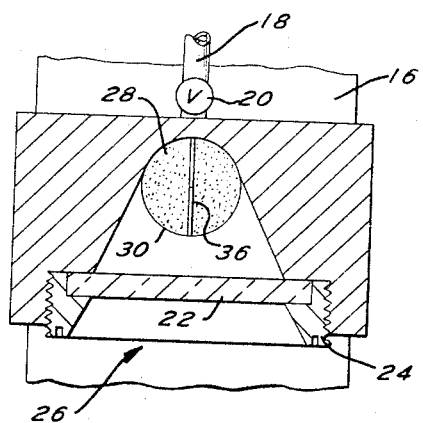
FIGURE 2 is a transverse view of the invention shown in FIGURE 1 taken along the line 2—2.

Referring to FIGURES 1 and 2 of the drawing, wherein like numerals indicate like elements, there is shown an apparatus for producing a source of high intensity chemically activated electromagnetic energy.

The apparatus 10 includes an elongated tube 12 having a cylinder 14 at one end thereof. The cylinder 14 is supported by a rotatable member 16. Member 16 is adapted to repetitively place a cylinder 14 in line with the tube 12 each time a chemically activated pulse of light energy is initiated.

A conduit 18 communicates with the interior of tube 12 at a point between the ends of the tube. A gaseous oxidizer is introduced into the tube 12 through conduit 18. The valve 20 on conduit 18 permits the oxidizer to be maintained in the tube 12 at a specified pressure. A high strength transparent window 22 made from a material such as quartz is mounted at the side of tube 12 by means of a ring 24 threaded into annular port 26.

The thin wall container 28 is tightly fitted within cylinder 14. Container 28 holds a quantity of finely divided metal powder 30 and seals said metal powder from contact with the oxygen atmosphere in the tube 12. A gas pressure in excess of the oxidizer pressure within the tube 12 exists in container 28. Explosive charge 32 is spaced behind container 28 in cylinder 14. The end of cylinder 14 is sealed by means of a frangible plug or rupture disc 34 located behind explosive charge 32. Immediately in front of container 28 is an explosive bridge wire 36.

To activate the flash action, the side 42 of metal powder container 28 away from explosive charge 32 is ruptured by exploding a bridge wire 36. Due to the excess pressure in container 28, the metal powder is disbursed into the tube 12 and intimately mixes with the oxidizer gas. After a suitable time interval, of the order of 50 milliseconds, to permit dispersion, the explosive charge 32 is detonated either by striking primer 38 or by sending an electric charge through said primer 38.

The explosion generates a planar shock wave which travels the length of tube 12 and reflects off the far end 40. The oxidizer-metal powder mixture behind the shock front is thus heated above the ignition point, and the metal powder undergoes rapid oxidation, with the final flaming temperature resulting from the release of energy by the oxidation of the metal powder plus the energy increase due to the shock wave. The radiant energy from this reaction is transmitted through the quartz window to a laser reflecting system, not shown. The reflecting system focuses the radiant energy upon a laser, which for example may be of the ruby rod type. It should be noted that since the optical window is mounted at right angles to the direction of propagation of the shock wave, it is not subjected to the direct impulsive shock of the wave. This lessens the material strength required in the window. The reaction temperatures attainable in this system are such that the energy released from the reaction plus that developed by the shock augmentation are sufficient to give calculated temperatures in excess of 5000° Kelvin, well up in the region of dissociation.

The frangible plug 34 is set to fail at the over pressures generated by the explosive charge 32. In this way, the tube 12 is vented. The plug is designed so that it fails after the main optical pulse has been delivered. In this manner, the tube 12 and cylinder 14 are not subjected to a long-term, high-pressure, high-temperature stress. This permits less massive construction and will help in removing excess thermal energy from the proximity of the laser itself. This is a distinct advantage since heating of the laser material detracts from its operation efficiency.

Repetitive action of the system is achieved by using preloaded cylinders 14 mounted on rotatable member 16. The cylinders 14 are brought into position at the end of tube 12 by means of a Gatling-gun type of mechanism.

An alternate method of assuring dispersion and intimate mixing of the metal powder with the oxidizer gas prior to firing the explosive charge 32 is to use shaped charge jets initiated by dimpling the front face 42 of explosive 32. These jets pierce the pressurized container 28 ahead of the main explosive shock wave. Metal powder-oxidizer mixing is thereby not only promoted by the excess container pressure but also is augmented by the piercing charge. This improves turbulence and, therefore, mixing.

A third method of assuring that the metal powder 30 mixes with the oxidizer is to electrostatically charge the powder. This method provides a more even distribution of particle dispersion. As is obvious, this third method may be combined with the bridge wire and shaped charge method.

Metal powders 30 are preferred as the energy source because the oxides formed have high exothermic heats of reaction, coupled with high melting and vaporization temperatures, leading to high flame temperatures. This in turn results in more energy being concentrated in the useful spectral regions. In addition, the reaction products are condensed phases which reduce the net over pressures resulting in the system. The metal powder 30 may be aluminum or mixed aluminum and zirconium. Aluminum, however, is preferred as it releases a high amount of energy on a per unit weight basis.

In order to enhance the spectral output of the system in the regions useful for laser pumping, additives in small amounts can be mixed with the metal powder 30. Such additives include iron thorium, alkali metals, alkaline earth metals, and rare earth metals.

The size and amount of metal powder may be varied to achieve different light outputs. In one example, an energy release in the range of $10^4$ joules was secured using about 0.5 gram of aluminum powder at a particle size of 10 microns. The volume of tube 12 was of the order of 350 cubic centimeters. The oxidizing agent used was oxygen at about one atmosphere of pressure in the 350 cubic centimeter tube. The method and apparatus are not limited to the use of oxygen. Other oxidizers may be used. Oxidation is defined as a chemical reaction whereby electrons are removed from one or more atoms of a substance.

The spectral distribution of the emitted light can be varied for a given metal powder-oxygen charge by varying the size of explosive charge 32. Changes in explosive charge 32 will vary the over pressure ratio of the shock wave, and therefore the shock velocity and temperature increase across the front of the wave. Higher weights of explosives result in more rapid ignition and apparent flame temperatures.

The metal powders and additives are all commercially available and, therefore, need not be described in detail. Similarly, the explosive charge is commercially available and need not be described in detail.

The present invention may be embodied in other specific forms without departing from the spirit or essential attributes thereof and, accordingly, reference should be made to the appended claims, rather than to the foregoing specification as indicating the scope of the invention.

I claim:
1. A method for chemically producing high intensity electromagnetic radiation including the steps of first dispersing finely divided metal particles in an atmosphere of a gaseous oxidizer, then explosively producing a shock wave to ignite the metal oxidizer mixture and rapidly oxidize the metal particles after the particles have been dispersed, thereby producing a high intensity pulse of electromagnetic radiation.

2. A method of producing a high intensity light pulse for pumping a laser including the steps of first introducing metal particles into an atmosphere of oxidizing agent and intimately mixing said metal particles with said oxidizing agent, then explosively producing a shock wave moving through the metal particle oxidizing agent mixture after the particles have been mixed with the oxidizing agent, whereby said shock wave initiates rapid oxidation of said metal particles and the energy of said reaction includes a high intensity pulse of light energy useful for laser pumping.

3. Apparatus for producing high intensity light pulse comprising a chamber, means for introducing an oxidizer into said chamber, means for dispersing and mixing the finely divided metal particles with said oxidizer, and means to subsequently generate a shock wave in said chamber after said metal particles have been dispersed and mixed with said oxidizer, whereby said metal particles chemically react with said oxidizer to produce a high intensity pulse of light.

4. Apparatus in accordance with claim 3 wherein said mixing means comprises a pressurized container holding said metal particles and a bridge wire adapted to rupture said container.

5. Apparatus in accordance with claim 3 wherein said shock wave generating means comprises an explosive charge.

6. Apparatus comprising means defining a hollow chamber, means for introducing an oxidizer into said chamber, a pressurized container containing finely divided metal particles disposed in said chamber, an explosive charge disposed between said container and one end of said chamber, means to rupture said container so as to mix said metal particles with said oxidizer, and means to detonate said explosive charge so as to ignite the metal particle oxidizer mixture, whereby a high intensity light beam is generated.

7. Apparatus in accordance with claim 6 wherein said rupturing means comprises shaped charge jets initiated by dimpling the face of said explosive charge.

8. Apparatus in accordance with claim 6 wherein transparent window means are disposed in the side of said hollow chamber.

9. Apparatus in accordance with claim 6 wherein venting means are provided in said one end of said chamber.

References Cited by the Examiner
UNITED STATES PATENTS

| | | | |
|---|---|---|---|
| 1,436,715 | 11/1922 | Jackson | 67—33 |
| 2,024,225 | 12/1935 | Igari | 67—33 |
| 2,603,155 | 7/1952 | Clarke et al. | 67—33 X |
| 2,926,566 | 3/1960 | Atkins et al. | 102—46 X |
| 3,163,799 | 12/1964 | Buchman | 331—94.5 X |
| 3,198,678 | 8/1965 | Zeman et al. | 102—28 X |

FREDERICK L. MATTESON, JR., *Primary Examiner.*
ROBERT A. DUA, *Examiner.*